United States Patent
Sugandhi et al.

(10) Patent No.: US 11,354,402 B2
(45) Date of Patent: Jun. 7, 2022

(54) VIRTUAL ENVIRONMENT TYPE VALIDATION FOR POLICY ENFORCEMENT

(71) Applicant: Microsoft Technology Licensing, LLC, Redmond, WA (US)

(72) Inventors: Tushar Suresh Sugandhi, Redmond, WA (US); Amber Tianqi Guo, Seattle, WA (US); Balaji Balasubramanyan, Redmond, WA (US); Abhijat Singh, Sammamish, WA (US); Ahmed Saruhan Karademir, Seattle, WA (US); Benjamin M. Schultz, Bellevue, WA (US); Hari R. Pulapaka, Redmond, WA (US); Gupta Shubham, Sammamish, WA (US); Chase Thomas, Kirkland, WA (US); Carlos Ernesto Peza Ramirez, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 16/672,429

(22) Filed: Nov. 1, 2019

(65) Prior Publication Data
US 2021/0133312 A1    May 6, 2021

(51) Int. Cl.
*G06F 21/51* (2013.01)
*G06F 9/455* (2018.01)
(Continued)

(52) U.S. Cl.
CPC .......... *G06F 21/51* (2013.01); *G06F 9/45558* (2013.01); *G06F 21/57* (2013.01);
(Continued)

(58) Field of Classification Search
CPC ........ G06F 21/105; G06F 21/51; G06F 21/53; G06F 21/57; G06F 2009/4557; H04L 9/3236; H04L 9/3263; H04L 2209/127
(Continued)

(56) References Cited

U.S. PATENT DOCUMENTS 8,316,237 B1 * 11/2012 Felsher ................. H04L 9/0825
                                                 713/171
8,763,159 B1 *  6/2014 Kobets .................. G06F 21/105
                                                 726/31
(Continued)

OTHER PUBLICATIONS

"International Search Report and Written Opinion Issued in PCT Application No. PCT/US20/056955", dated Jan. 25, 2021, 10 Pages.

*Primary Examiner* — Samson B Lemma

(57) ABSTRACT

Environment type validation can provide a tamper-resistant validation of the computing environment within which the environment type validation is being performed. Such information can then be utilized to perform policy management, which can include omitting verifications in order to facilitate the sharing of policy, such as application licenses, from a host computing environment into a container virtual computing environment. The environment type validation can perform multiple checks, including verification of the encryption infrastructure of the computing environment, verification of code integrity mechanisms of that computing environment, checks for the presence of functionality evidencing a hypervisor, checks for the presence or absence of predetermined system drivers, or other like operating system components or functionality, checks for the activation or deactivation of resource management stacks, and checks for the presence or absence of predetermined values in firmware.

20 Claims, 6 Drawing Sheets

(51) Int. Cl.
*G06F 21/57* (2013.01)
*H04L 9/32* (2006.01)
(52) U.S. Cl.
CPC .......... *H04L 9/3236* (2013.01); *H04L 9/3263* (2013.01); *G06F 2009/4557* (2013.01); *H04L 2209/127* (2013.01)
(58) Field of Classification Search
USPC ........................................................ 713/187
See application file for complete search history.

(56) References Cited

U.S. PATENT DOCUMENTS

| | | | |
|---|---|---|---|
| 10,127,030 B1* | 11/2018 | Mortman | H04L 9/3236 |
| 2013/0144725 A1* | 6/2013 | Li | H04N 21/23424 |
| | | | 705/14.66 |
| 2015/0319160 A1* | 11/2015 | Ferguson | G06F 12/08 |
| | | | 726/10 |
| 2017/0364685 A1* | 12/2017 | Shah | G06F 21/53 |
| 2018/0198824 A1* | 7/2018 | Pulapaka | G06F 9/455 |
| 2018/0294962 A1* | 10/2018 | Kraemer | G09C 1/00 |
| 2019/0372938 A1* | 12/2019 | Pasdar | G06F 16/22 |
| 2020/0285737 A1* | 9/2020 | Kraus | H04L 63/1408 |

* cited by examiner

VIRTUAL ENVIRONMENT TYPE VALIDATION FOR POLICY ENFORCEMENT

BACKGROUND

Traditional virtual computing environments, commonly termed "virtual machines", virtualize most or all aspects of a computing environment, and can, thereby, present computing environments that are very different from the host computing device hardware and operating system. However, traditional virtual computing environments, because of the need to virtualize most or all aspects of the host computing environment, can consume large quantities of memory, require extensive processing resources, and can otherwise be inefficient. In some instances, lightweight virtual computing environments, often termed "containers", can provide many of the isolation benefits of traditional virtual computing environments in a more efficient manner, such as by utilizing aspects of the host computing device hardware and operating system, instead of virtualizing those aspects of the computing environment. As such, containers can be utilized to provide isolated computing environment, such as to limit the impact of potentially malicious instructions, provide virgin computing environment, such as for testing or troubleshooting purposes, and other like benefits.

For example, a user receiving a word processing document as an attachment in an email message may be concerned that opening the word processing document may cause the execution of malicious computer-executable instructions that can infect, damage, or otherwise negatively impact the user's computer. To prevent such a negative impact, the word processing document can be opened by an appropriate word processing application program executing in a container. Executable instructions executing within a container can be unaware of anything beyond the virtual computing environment presented by the container. Thus, if the word processing document did contain malicious computer-executable instructions, such instructions would only be able to infect the virtual computing environment of the container, which can be easily deleted or otherwise destroyed with no harm to the user's primary computing environment.

Unfortunately, because containers are perceived, by the computer-executable instructions being executed therein, as computing environment that different and distinct from the user's primary computing environment, the execution of application programs within a container may require another license, or may otherwise be unable to utilize licenses or other policy established by the user within the primary computing environment. Such additional licensing requirements can unnecessarily increase user costs or can otherwise prevent the user from utilizing their applications within container environment. Merely allowing application programs to execute within a container based on a properly licensed application in the user's primary computing environment, however, creates a mechanism that can be easily exploited. For example, such a mechanism could be utilized to improperly share a single-user, single-instance application program license across multiple users and across multiple different computing environment, including different physical computing devices, and different virtual machines, such as can be hosted in large quantities and made available to anyone over the Internet.

SUMMARY

An environment type validation can provide a tamper-resistant validation of the computing environment within which the environment type validation is being performed. Such information can then be utilized to perform policy management, which can include omitting verifications in order to facilitate the sharing of policy, such as application licenses, from a host computing environment into a container virtual computing environment. The environment type validation can perform multiple checks, including verification of the encryption infrastructure of the computing environment within which the environment type validation is being performed, verification of code integrity mechanisms of that computing environment, checks for the presence of functionality evidencing a hypervisor, checks for the presence or absence of predetermined system drivers, or other like operating system components or functionality, checks for the activation or deactivation of resource management stacks, checks for the presence or absence of predetermined values in firmware, and other like checks that can be performed within the computing environment whose environment type is being validated. In such a manner, policy management can enable the sharing of policy, including application licenses, between a host computing environment and a container virtual computing environment, while impeding the utilization of such policy sharing for malicious purposes, such as to improperly gain access to application programs, or specific functionality offered thereby, by spoofing a computing environment hosted directly by computing hardware, or by virtual machines, into appearing as a container virtual computing environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
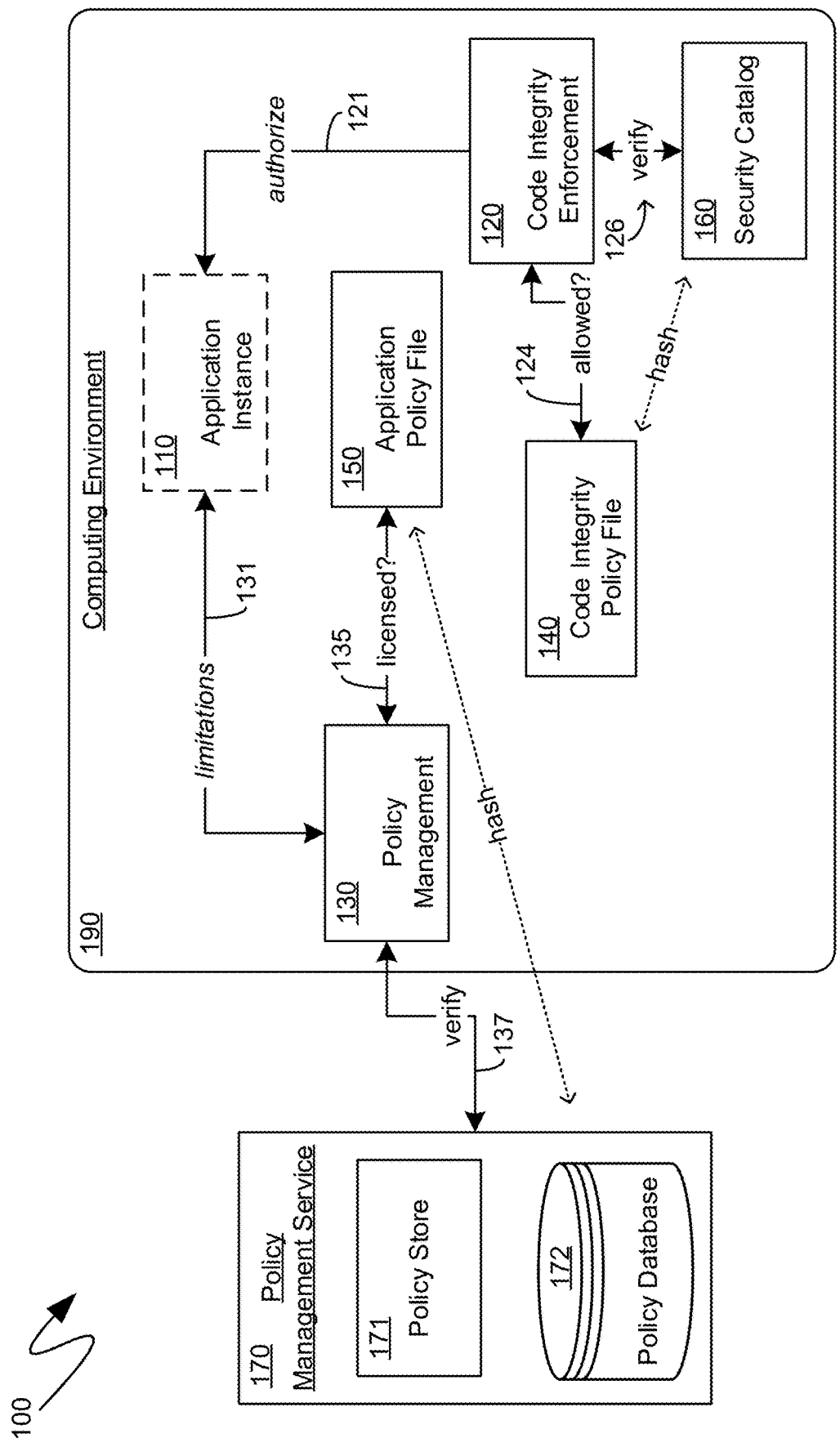
FIG. 1 is a system diagram of an exemplary system for policy enforcement.

The following description relates to tamper-resistant environment type detection to enable the sharing of policy, including application licenses, between a host computing environment and a container virtual computing environment, while impeding the utilization of such policy sharing for malicious purposes, such as to improperly gain access to application programs, or specific functionality offered thereby, by spoofing a computing environment hosted directly by computing hardware, or by virtual machines, into appearing as a container virtual computing environment. An environment type validation can provide a tamper-resistant validation of the computing environment within which the environment type validation is being performed. Such information can then be utilized to perform policy management, which can include omitting verifications in order to facilitate the sharing of policy, such as application licenses, from a host computing environment into a container virtual computing environment. The environment type validation can perform multiple checks, including verification of the encryption infrastructure of the computing environment within which the environment type validation is being performed, verification of code integrity mechanisms of that computing environment, checks for the presence of functionality evidencing a hypervisor, checks for the presence or absence of predetermined system drivers, or other like operating system components or functionality, checks for the activation or deactivation of resource management stacks, checks for the presence or absence of predetermined values in firmware, and other like checks that can be performed within the computing environment whose environment type is being validated.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environment where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 comprises an exemplary computing environment 190, which, for purposes of providing context for the descriptions below, can be a computing environment created by an operating system executing directly on computing hardware, sometimes referred to as a "bare metal" environment. Descriptions below will be directed to other types of computing environments, namely virtual computing environments, such as the computing environment created by virtual machine programs and such as the computing environment created by container processes.

Typically, when an application program is instantiated, the ability of the application program to execute can be affected by protections present within the computing environment 190, such as, for example, code integrity protections that delineate which application programs can execute within the computing environment. Such protections can be based on a whitelist, whereby application programs that are not explicitly enumerated are prevented from executing within the computing environment 190, or such protections can be based on a blacklist, whereby application programs are allowed to execute within the computing environment 190 unless they are explicitly enumerated within the blacklist.

The subsequent execution of an application program can be further affected by policy management, which can include verifying that the application program is properly licensed to execute within the computing environment 190. For example, an application program that is not properly licensed can terminate its execution, or it can present a limited set of functionalities to the user, such as trial functionality by which the user can evaluate the application program, but not utilize it fully without a proper license.

Within the exemplary system 100 of FIG. 1 an application program can be instantiated into the application instance 110. The application instance 110 is illustrated with dashed lines to indicate that its execution can be contingent upon multiple factors, including, for example, the authorization 121 provided by the exemplary code integrity enforcement 120 and any limitations enforced by the exemplary policy management 130. Turning first to the exemplary code integrity enforcement 120, instantiation of the application program into the application instance 110 can entail a determination 124, by the exemplary code integrity enforcement 120, whether a relevant code integrity policy file, such as the exemplary code integrity policy file 140, permits execution of the application program within the computing environment 190. As indicated previously, the code integrity policy file 140 can be either in the form of a blacklist or a whitelist.

According to one aspect, in addition to referencing a code integrity policy file, such as the exemplary code integrity policy file 140, the exemplary code integrity enforcement 120 can further perform a verification that the referenced code integrity policy file 140 has not been tampered with to improperly indicate that the application should be allowed to execute. Such a verification can entail comparing a hash of the code integrity policy file 140 to a hash of a known good policy file, such as can be stored in a security catalog 160. For example, a hash of the code integrity policy file 140 can be generated when the computing environment 190 is first created, and such a hash can be stored in the exemplary security catalog 160. To prevent tampering of the security catalog 160, the security catalog 160 can be signed by an organization's trust certificate, or other like trusted authority's cryptographic information. The code integrity policy file 140 that is referenced by the code integrity enforcement 120 can be hashed, and the resulting hash can be compared with the corresponding hash stored in the security catalog 160, with a matching comparison indicating that the code integrity policy file 140 being referenced has not been improperly modified or tampered with, and, thereby contains accurate information.

The instantiation of an application program can be further affected by policy management, such as the exemplary policy management 130, which can enforce licenses, organizational policy or other like policy-based limitations. For example, a developer of the application program being instantiated into the application instance 110 can, to prevent piracy of their application program, and to provide for monetization of their programming efforts, prevent the application program from executing unless it is properly licensed, such as by a user purchasing a license from the developer. In such an instance, the exemplary application policy file 150 can be in the form of a license. The exemplary application policy file 150 can be referenced upon instantiation of the application program in order to inform, or limit, the execution of the application. For example, if the application policy file 150 is missing, the application program can be notified and can terminate execution. As another example, the application program may present limited functionality if it is not properly licensed or if the license cannot be located.

In addition to licensing, other forms of policy can be enforced by the exemplary policy management 130. For example, an organization may seek to prevent the execution of specific applications on that organization's computing devices. In such an instance, the exemplary application policy file 150 can be a whitelist or blacklist that can be curated by the organization. Other examples of application policy files can include transaction policy files, which can seek to prevent certain forms of transactions, such as in-app purchases, payments utilizing a specific computerized payment scheme, and the like. Still other examples of application policy files can include deployment policy files and certificates.

Policy files, such as the exemplary application policy file 150, can provide a mechanism by which conditional behavior of an application program can be enforced. As indicated, such conditional behavior can be desired by the developer of the application program, an organization providing the computing environment 190, or other like authority. Such conditions can be based on user identifiers, computing device identifiers, or other environmental factors. For example, the exemplary application policy file 150 can be a license, validly purchased from the application program developer, that can indicate that it expires on a specific date. Consequently, the exemplary policy management 130 can obtain current date information in order to determine, as illustrated by the determination 135, whether the exemplary application policy file 150 contains information that would affect the execution of the application program. For example, if the current date information is passed the date indicated in the exemplary application policy file 150, exemplary policy management 130 can provide an indication to the application program that it is no longer properly licensed. As another example, the exemplary application policy file 150 can be a validly purchased license that can be limited to a specific user, or a specific computing device. In such instances, the exemplary policy management 130 can obtain a user identifier, a computing device identifier, or other like information in order to determine, as illustrated by the determination 135, whether the exemplary application policy file 150 contains information that would affect the execution of the application program. Again, as before, if the policy management 130 determines that, for example, the user identifier of the user seeking to instantiate the application program into the application instance 110 differs from that required by the application policy file 150, it can so notify the application program, which can then take appropriate remedial action, such as by terminating its execution, or presenting only a limited set of functionality.

According to one aspect, to verify that an application policy file, such as the exemplary application policy file 150, has not been improperly modified or otherwise improperly tampered with, a hash of the application policy file 150 can be compared with a hash of a "known good" application policy file, or an application policy file whose hash was taken at a time when the file could, practically, not have been tampered with or otherwise modified from its intended state. For example, a policy management service, such as the exemplary policy management service 170, can serve as a clearinghouse for policies and can retain hashes of "known good" policies. The exemplary policy management service 170 can be a centralized service, such as that executed on one or more server computing devices and accessible through network communications with such computing devices. Alternatively, or in addition, the exemplary policy management service 170 can execute locally on a same computing device that is executing the computing environment 190, except in a separate process or other like encapsulation. According to one aspect, a policy management service, such as the exemplary policy management service 170, can comprise a policy store, such as the exemplary policy store 171, and a policy database, such as the exemplary policy database 172. The exemplary policy store 171 can provide a mechanism by which updated policy information can be actively distributed, such as to multiple computing devices of an organization, multiple computing devices that have previously licensed an application program, such as from an application developer or an application program store, or other like active distribution of updated policy information. A most recent policy can be stored in the policy database 172, together with hashes corresponding to those most recent policies. Because the policy management service 170 can be inaccessible, or less easily accessible, than the application policy file 150, and can provide for additional protections, and otherwise prevent tampering, one mechanism of verifying that the exemplary application policy file 150 has not been tampered, or otherwise modified, can be to hash the exemplary application policy file 150 and compare the obtained hash value to a corresponding hash value stored in the policy database 172, or by otherwise communicating with the exemplary policy management service 170. Once such a verification action 137 is performed, the conditional requirements of the application policy file 150, such as detailed above, can be considered, and the application can be notified, as illustrated by the exemplary notification 131, of any limitations or other like impacts on the application's execution, that may be necessitated by the evaluation of the corresponding application policy file 150.

Although illustrated as a separate component, according to one aspect, the exemplary policy management 130 can be part of the exemplary application instance 110. In other words, some applications may reference their own application policy files, without need for external, independently provided policy management functionality.

As indicated previously, there can be instances where a user may seek to execute an application program within a container virtual computing environment rather on the "bare metal" or within a full-fledged virtual machine-hosted computing environment, such as is often made available by cloud computing providers. For example, there may be security concerns affecting the execution of the application program, or the files which the application program will operate upon, that may be ameliorated by executing the application program within a confined, protected computing environment which can be easily deleted or terminated should the need arise. As another example, there may be advantages to executing the application program within a clean computing environment. For example, webpages often utilize cookies, or other repositories of data, to track users, such as by recording the webpages visited, search terms utilized, and other like personal information. Thus, a user that does not wish to allow webpages access to previously stored information, such as cookies, can execute a web browser application program within a container virtual computing environment that can be a clean computing environment that does not comprise such cookies or other like data.

As utilized herein, the term "container" means a process that creates a separate computing environment without virtualizing the software and hardware in the manner of a virtual machine application program, but, instead, utilizing aspects of its host computing environment, including hardware and a defined subset of operating system processes and functionality.

Figure 2:
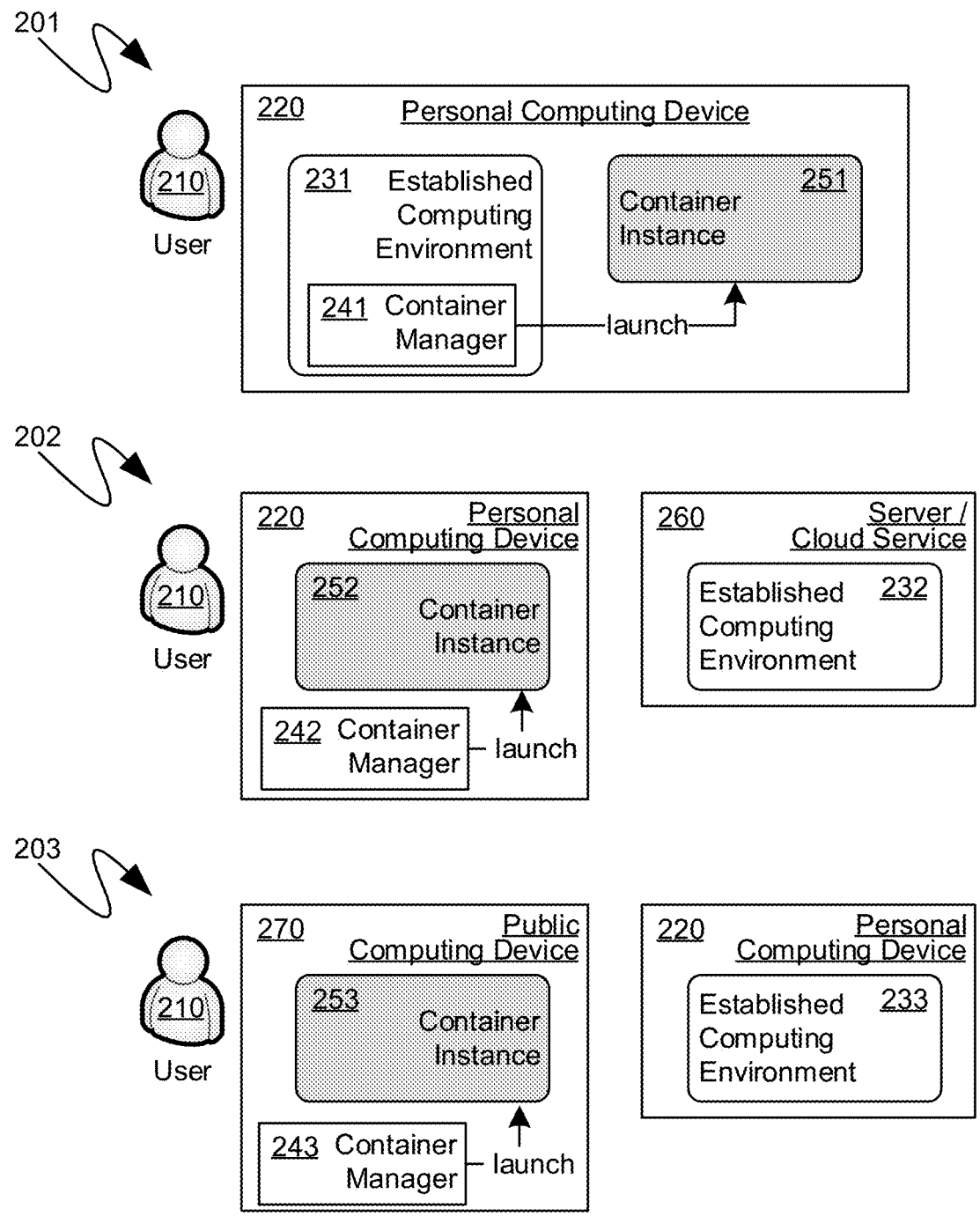
FIG. 2 is a system diagram of exemplary systems comprising container virtual computing environments.

Turning to FIG. 2, the systems shown therein illustrates different associations between a container virtual computing environment and an established computing environment, such as a user might be presented by their personal computing device. For example, the exemplary system 201 comprises a user 210 utilizing a personal computing device 220. The exemplary personal computing device 220 can present, to the user 210, an established computing environment 231, such as can be generated by an operating system and corresponding computer-executable instructions, executing on the personal computing device 220. Such an established personal computing environment 231 can comprise a container manager 241 that can comprise computer-executable instructions that can establish container virtual computing environment and share appropriate aspects of the operating system or other like resources of the established computing environment 231. Should the user 210 need such a container virtual computing environment, such as, for example, to open an email attachment that may be malicious, the container manager 241 can create a container instance, such as the exemplary container instance 251, which can also be executed by the same personal computing device 220.

As another example, the exemplary system 202 illustrates the user 210 utilizing a personal computing device, such as the exemplary personal computing device 220, to connect to a server computing device 260, such as a server provided by a cloud service. The exemplary server computing device 260 can execute an established computing environment 232, which can be a virtual-machine-hosted virtual computing environment. The established computing environment 232 can comprise application programs that the user seeks to utilize on the personal computing device 220. One mechanism by which the user 210 can utilize such application programs on their personal computing device 220 can be within a container instance that can isolate other aspects of the personal computing device 220 from such applications. In the exemplary system 202, a container manager, such as the exemplary container manager 242, executing on the personal computing device 220, can launch a container instance, such as the exemplary container instance 252. The established computing environment 232, on the cloud service 260, can establish appropriate communications to act as the host computing environment for the container instance 252, even though the container instance 252 can be managed by a container manager 242 executing remotely from the cloud service 260.

In a similar manner, as illustrated by the exemplary system 203, a user 210, utilizing a public computing device 270, such as, for example, a public kiosk, may seek to remote into the user's personal computing device 220 in a secure manner. In such an instance, the established computing environment 233, executing on the user's personal computing device 220, can communicate with a container manager executing on the public computing device 270, such as the exemplary container manager 243. The exemplary container manager 243 can then create a container instance 253 on the public computing device 270, with the established computing environment 233, executing on the remote personal computing device 220, acting as a host environment for the container instance 253.

As indicated previously, because a container virtual computing environment can be perceived, by computer-executable instructions executing within the container virtual computing environment, as a separate computing device, licenses and other like policy aspects may not translate over to a container virtual computing environment. Thus, for example, a user, receiving a word processing attachment via an email message that the user is concerned may be malicious, can open the attachment utilizing a word processing application program executing within a container virtual computing environment. However, while the user may have a valid license to utilize the word processing application program, such a license may be limited to the host computing environment, and, thus, when the user attempts to open the attachment utilizing the word processing application program executing within the container virtual computing environment, the user may receive an indication that their word processing application program is unlicensed since, from the perspective of the computer-executable instructions executing within the container virtual computing environment, it may appear as if the application is being executed on a different computing device by a different user. As such, if the user has available to them multiple licenses for the application program, opening of the attachment utilizing the word processing application program executing within the container virtual computing environment may cause another license, from a pre-purchased set of licenses, to be consumed without the user's consent. Unfortunately, however, simply disabling license checks for application programs executed within container virtual computing environments, can enable malicious users to easily pirate, or otherwise improperly obtain, application programs simply by causing the malicious user's personal computing device to present as a container virtual computing environment of an authorized user, thereby enabling an authorized user's single license to be improperly shared among many different users and utilized across many different computing devices.

To prevent such piracy and other improper obtaining of application programs, while at the same time facilitating the legitimate use of application programs within container virtual computing environments, an environment type validation can be performed to validate that the computing environment is, indeed, a proper container, and is not otherwise merely presenting as such in order to bypass license, or other policy, restrictions. Such environment type validation can then inform the appropriate policy management mechanisms to enable application programs to respond appropriately.

Figure 3:
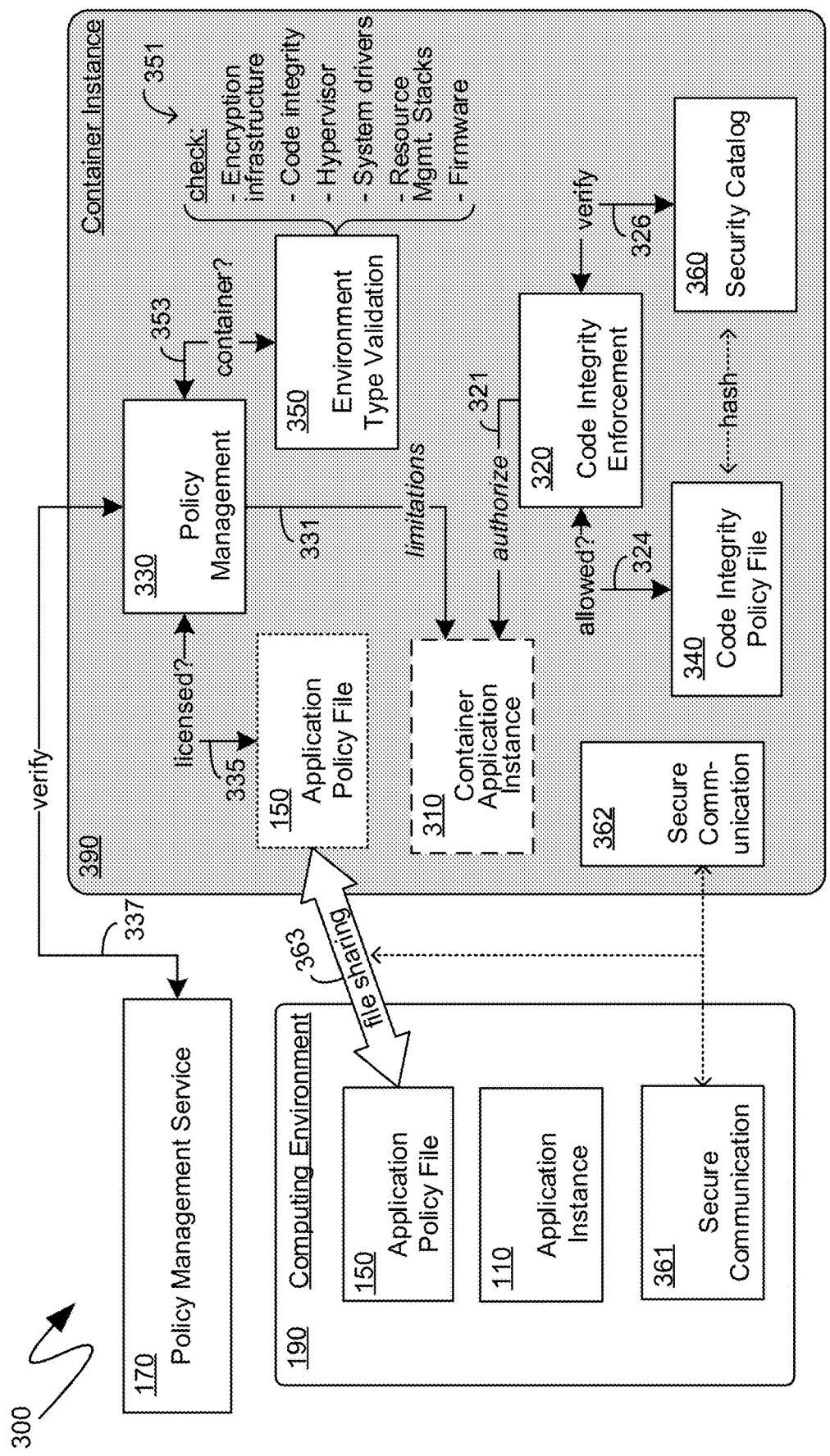
FIG. 3 is a system diagram of an exemplary system for virtual environment type validation and policy enforcement.

Turning to FIG. 3, the exemplary system 300 shown therein illustrates the exemplary policy management service 170 and the exemplary computing environment 190, which were previously described in detail. In addition, a virtual computing environment created by a container process, in the form of the exemplary container instance 390, is also illustrated in the exemplary system 300 FIG. 3. The exemplary container instance 390 can have been created by container management functionality, such as that detailed above with respect to FIG. 2, and the exemplary computing environment 190 can act as a host for the exemplary container instance 390. As will be detailed below, the mechanisms illustrated and described herein can enable a container application instance 310 of a same application program as the application instance 110, executing within the computing environment 190, to execute within the virtual computing environment of the container instance 390, while utilizing the application policy file 150 from the host computing environment 190.

According to one aspect, secure communications can be established between the host computing environment 190 and the container instance 390, such as by the exemplary secure communication mechanisms 361 and 362. The exemplary secure communication mechanisms 361 and 362 can be based on asymmetric key cryptographic constructs. For example, when the container instance 390 is launched, such as in a manner detailed above, the container instance 390 can be provided with a public key portion of an asymmetric key algorithm established by the host computing environment, such as the exemplary computing environment 190. As another example, the container instance 390 can be provided with seed data from which, utilizing known cryptographic mechanisms, the secure communication mechanism 362 executing within the container instance 390 can derive the same keys as the exemplary secure communication mechanism 361 executing within the host computing environment 190. As yet another example, the user can be required to manually enter required cryptographic information into both the secure communication mechanism 361 and the secure communication mechanism 362, or other like out-of-band communications can be utilized to securely exchange cryptographic information utilizable to establish a secure communicational connection.

Once secure communications between the exemplary host computing environment 190 and the exemplary container instance 390 are established, the application policy file 150, described in detail above with reference to FIG. 1, can be shared with the container instance 390 from the exemplary host computing environment 190. For example, a secure file sharing, such as the exemplary file sharing 363, can be established, whereby processes executing within the container instance 390 can access the application policy 150 in the exemplary host computing environment 190. The application policy file 150 is illustrated in both the exemplary host computing environment 190 and the exemplary container instance 390 to visually represent the accessing of the application policy file 150 from within the container instance 390.

According to one aspect, when a container instance of the application 310 is attempted to be instantiated, a code integrity enforcement, such as the exemplary code integrity enforcement 320, analogous to the exemplary code integrity enforcement 120 described in detail above, can verify that the application is allowed to execute within the container instance 390. For example, the container instance 390 can have been created with a code integrity policy file 340 that can differ from the code integrity policy file 140, shown in FIG. 1, which can be part of the computing environment 190. As another example, the computing environment 190 may not execute a code integrity enforcement 120, shown in FIG. 1, and the code integrity enforcement can be limited to container instances, such as the exemplary code integrity enforcement 320 executing within the exemplary container instance 390.

As before, the code integrity enforcement, such as the exemplary code integrity enforcement 320, can authorize 321 the instantiation of the container application instance 310 based on a check 324 that the relevant code integrity policy file, such as the exemplary code integrity policy file 340, provides for the execution of the container application instance 310 within the exemplary container instance 390, and a further verification 326, such as by referencing the exemplary security catalog 360, that the code integrity policy file 340 has not been modified or tampered. As before, such a verification can be based on hash comparisons.

Additionally, as also described above, a policy management, such as the exemplary policy management 330, can further affect the instantiation of the container application instance 310. According to one aspect, however, when executing within a container instance, such as the exemplary container instance 390, the exemplary policy management 330 can be informed by an environment type validation, such as the exemplary environment type validation 350, which can provide information regarding the type of execution environment within which the policy management 330 and/or the container application instance 310 are executing. For example, an environment type validation can provide an indication of whether or not the container instance 390 is, actually, a proper container, thereby enabling detection of other types of execution environments that may maliciously present as container execution environments in an effort to exploit licensing restrictions and gain improper access to application program functionality. The information provided by the environment type validation 350 information can then be utilized by the policy management 330 in reference to the shared application policy file 150. Alternatively, or in addition, the environment type validation 350 can inform the creation of the file sharing 363 in the first place. For example, based on mechanisms that will be detailed further below, if the environment type validation 350 determines that the container instance 390 is not a proper container, such as, for example, if the container instance 390 is a virtual-machine-hosted virtual computing environment, or is a computing environment of another computing device, and is merely being maliciously modified to appear as a container instance for purposes of improperly accessing an application program, then the environment type validation 350 can prevent the creation of the file sharing 363, such as by withholding relevant information, such as necessary cryptographic information, or such as by explicitly instructing that the file sharing 363 not be created. According to such an aspect, the application policy file 150 would, therefore, not be accessible from within the container instance 390, and the container application instance 310 would not be properly licensed, thereby presenting piracy via spoofing of the virtual environment type.

Returning to the aspect indicated above, whereby the environment type validation 350 provides information 353 providing information regarding the container instance 390, such information 353 can then be utilized, by the policy management 330, to perform a check 335 of the application policy file 150 as shared from the computing environment 190. For example, the application policy file 150 may comprise information indicating that the application program cannot be properly licensed to execute within a container instance, such as the exemplary container instance 390. In such a case, the policy management 330 can generate a notification 331 that the container application instance 310 is not associated with a valid application policy file 150, thereby allowing the container application instance 310 to terminate its execution, or otherwise present a reduced set of functionality. As another example, the application policy 150 may comprise information indicating that the application program is licensed to execute within a container instance, such as the exemplary container instance 390. In such a case, the application policy 150 can comprise further information to facilitate the licensing of an application program executing within a container instance. For example, because the container instance 390 may comprise a different machine identifier, or may not be able to access the user identifier, checks based on user identifiers, machine identifiers and the like, including those detailed above, may not be able to be performed from within the container instance 390. Accordingly, the application policy 150 can enable the omitting of such verifications if the container application instance 310 is being executed within a proper container instance. As such, the information provided by the environment type validation 350 can prevent the utilization of such verification omission for malicious purposes, such as to obtain access to the application program improperly.

According to one aspect, the policy management 330 can perform a verification 337, with reference to the policy management service 170, in a manner analogous to that detailed above. For example, the policy management 330 can hash the application policy file 150 and can compare such a hash, or can request that the policy management service 170 compare such a hash, to a hash of a known good application policy file. According to one aspect, if the hash matches a known good application policy file hash, the policy management service 170 can further check whether the application policy corresponding to such a hash has already been assigned, such as, for example, to the application instance 110 that can be executing within the computing environment 190. If the application policy has not already been assigned, or if it has been already assigned but the query from the policy management 330 originates from a proper container instance, such as determined by the environment type validation 350, the policy management service 170 can respond that the query has been validated. In such a manner, the verification can be made that both the application policy 150 has not been tampered with, or otherwise modified, and also that the request is originating from a proper container instance. The exemplary policy management 330 can then allow the container application instance 310 to continue executing and provide full licensed functionality.

As indicated previously, policy management, such as the exemplary policy management 330, can be part of an application program, such as the exemplary container application instance 310. Similarly, as also indicated previously, a policy management service, such as the exemplary policy management service 170, can execute on one or more remote computing devices, a same computing device, except outside of the container instance 390, or within the container instance 390. The environment type validation, whose operation will be detailed further below, can also be part of the application program, or can be separate, and invoked by the policy management 330, such as in the manner illustrated in the exemplary system 300 of FIG. 3, or can be invoked by the application program directly.

Turning to the operation 351 of the exemplary environment type validation 350, according to one aspect, the exemplary environment type validation 350 can provide information 353 in the form of a Boolean that only indicates whether or not the container instance 390 is, or is not, a "proper" container, where the "propriety" of the container instance 390 can be determined in advance and evaluated based on a series of predefined checks, such as will be detailed further below. According to another aspect, however, the exemplary environment type validation 350 can output information 353 that can identify a specific type of execution environment, such as differentiating between computing environments hosted by virtual machine application programs and computing environments hosted by container instances. According to yet another aspect, the information 353 provided by the exemplary environment type validation 350 can comprise information regarding environment type, or other environment type metadata, that may be relevant to one or more conditions enumerated in the application policy file 150, or which may otherwise inform conditional behavior of the policy management 330. For example, the information 353 can comprise details regarding one or more of the checks that the environment type validation 350 can provide.

For purposes of describing the operation of an environment type validation, such as the exemplary environment type validation 350, reference will be made to the output 353 in the form of a Boolean. However, as detailed above, the operation 351 described can equally produce output 353 that can vary in scope and complexity. Turning to the exemplary operation 351, as illustrated in FIG. 3, multiple checks can be made to validate that the container instance 390 is a proper container instance and not a different virtual computing environment that has been spoofed, or otherwise modified, to appear as a container instance in order to, for example, take advantage of less restrictive application policy, or otherwise improperly gain access to an application program.

According to one aspect, the environment type validation can verify the cryptographic infrastructure of the virtual computing environment within which the environment type validation is executing, including the cryptographic infrastructure utilized by, for example, the secure communication mechanisms 361 and 362. For example, the environment type validation 350 can check whether certificate stores are available within the container instance 390. Within such certificate stores, the environment type validation 350 can check whether the certificates have, or are signed by, the expected root of trust, which can be an organization's root of trust, or another known good root of trust. As another example, the environment type validation 350 can leverage existing attestation technologies within the container instance 390. For example, an operating system executing within the virtual computing environment provided by the container instance 390 can "measure", such as by hashing, modules or other like collections of computer-executable instructions as they are loaded by the operating system as part of the boot sequence. Such measurements can be performed with the aid of a Trusted Platform Module (TPM), which can securely store such measurements. Upon completion of the booting of the operating system, a resulting measurement should match a known good measurement if all of the modules and like collections of computer-executable instructions that were loaded as part of the operating system's boot were unmodified and otherwise proper. In such an instance, the environment type validation 350 can confirm that such an attestation was performed, and was performed correctly, such as by referencing the measurement of the booted operating system as compared with known good measurements. The environment type validation 350 can utilize external attestation services to compare the measurement of the booted operating system of the container instance 390 to known good measurements. If the measurements do not match, the environment type validation 350 can conclude that the container instance 390 is not a proper container instance. While described above with reference to operating system components, such attestation can be extended to the launching of specific application programs, including the application program instantiated to create the container application instance 310.

According to another aspect, the environment type validation can verify the code integrity infrastructure of the container instance 390. For example, the environment type validation 350 can interface with the code integrity enforcement 320 to verify the hash of the code integrity policy file 340, verify the signature of the security catalog 360, which, as indicated previously, can be signed by an organization's trust certificate, or other like root of trust, or can perform other verifications of the code integrity enforcement 320. A failure of any one or more of such verifications can result in the environment type validation 350 concluding that the virtual environment within which it is executing is not a proper container instance. Verifications of the code integrity infrastructure can be utilized in combination with more restrictive code integrity enforcement within container instances to further reduce piracy or other malicious behavior. For example, container instances can be created with limited, whitelist-type code integrity policy files, such as the exemplary code integrity policy file 340. The container instance 390 could, for example, comprise a code integrity polity file 340 can could only allow the container application instance 310, or an otherwise appropriately limited whitelist. Any attempt to utilize such a container instance 390 to execute a different application could fail, either due to the code integrity enforcement 320, or, if the code integrity infrastructure is improperly modified to allow the execution of the different application, such a modification could be detected by the environment type validation 350, which could then generate information 353 that would, again, prevent the utilization of the container instance 390 to execute such a different application.

According to yet another aspect, the environment type validation 350 can perform checks for various functionality, or the absence thereof, specific code segments, or the absence thereof, and other like indicators of environment type. For example, the environment type validation 350 can check whether a hypervisor is present, or accessible. Such a check can be performed through application program interfaces that can query the capabilities of one or more central processing units. More specifically, central processing units having hypervisor capabilities may expose such functionality or capabilities through such application program interfaces, and the presence of such functionality or capabilities can indicate that a hypervisor is present. According to one aspect, if the environment type validation 350 detects the presence of a hypervisor, it can conclude that the environment within which it is executing is not a proper container, or otherwise conclude that the environment is not a container-hosted execution environment and, instead, may be a virtual machine hosted execution environment. Similarly, the environment type validation 350 can check whether specific system drivers are present within the environment. The presence or absence of such system drivers can cause the environment type validation 350 to conclude that the environment within which it is executing is not a proper container. Similar checks can be made as to, for example, whether specific functionality is turned off. In particular, the environment type validation 350 can check whether resource management stacks are turned off, and, if such resource management stacks are not turned off, then the environment type validation 350 can conclude that the container instance 390 is not proper. Another check can be made to the firmware, as accessible from the execution environment. For example, specific firmware variables can be required to be added to the environment, such as by a container manager, or the host computing environment, such as the exemplary host computing environment 190. The absence of such firmware variables can cause the environment type validation 350 to conclude that the container instance 390 is not a proper container.

The operation 351 described above is merely exemplary, and the checks performed, and their sequence, can be tailored to detect specific attack vectors or other like avenues by which malicious or improper utilizations can be achieved. Other checks can equally be performed and, again, as indicated previously, the output 353, provided by the environment type validation 350 can provide greater detail, such as identifying a specific execution environment type, or proving information regarding one or more of the checks. For example, the exemplary environment type validation 350 can check whether the container instance 390 is kernel isolated or not. As another example, the environment type validation 350 can check for specific exposed operating system functionality.

According to one aspect, the information 353, provided by the environment type validation 350, can enable the policy management 330 and/or the container application instance 310 to select from among multiple different versions of the application program, including different versions that may be generated, sold and/or treated as separate products (such as by having different SKU numbers or other like product identifiers). For example, if specific ones of the checks 351 are passed, the environment type validation 350 can provide output 353 indicative of such checks being passed to the policy management 330, which, as indicated previously, can be part of the container application instance 310. The policy management 330, such as by reference to the application policy file 150, can determine that, for example, based on the information 353 provided by the environment type validation 350, one version of the application program being instantiated into the container application instance 310 may be allowed to execute within the container instance 390, but that another version of the same application program may not be allowed to execute. For example, the detection of a lack of specific system drivers in the container instance 390, by the environment type validation 350, can cause the policy management 330 to, for example, allow a more limited version of a music editing program to execute that does not allow for the input of external audio sources, such as microphones. In such an example, the detection, by the environment type validation 350 cannot cause the container application instance 310 to terminate execution, but can instead, cause it to execute a different version of the application program product. Thus, containing such an example, if the application instance 110 is an extended version of a music editing program, and the user executed the same music editing program in the container instance 390, the detections, by the environment type validation 350, in combination with the policy management 330, acting on the information 353 provided by the environment type validation 350, can cause the application program to seamlessly transition and execute a more limited version of the same music editing program as the container application instance 310.

Figure 4:
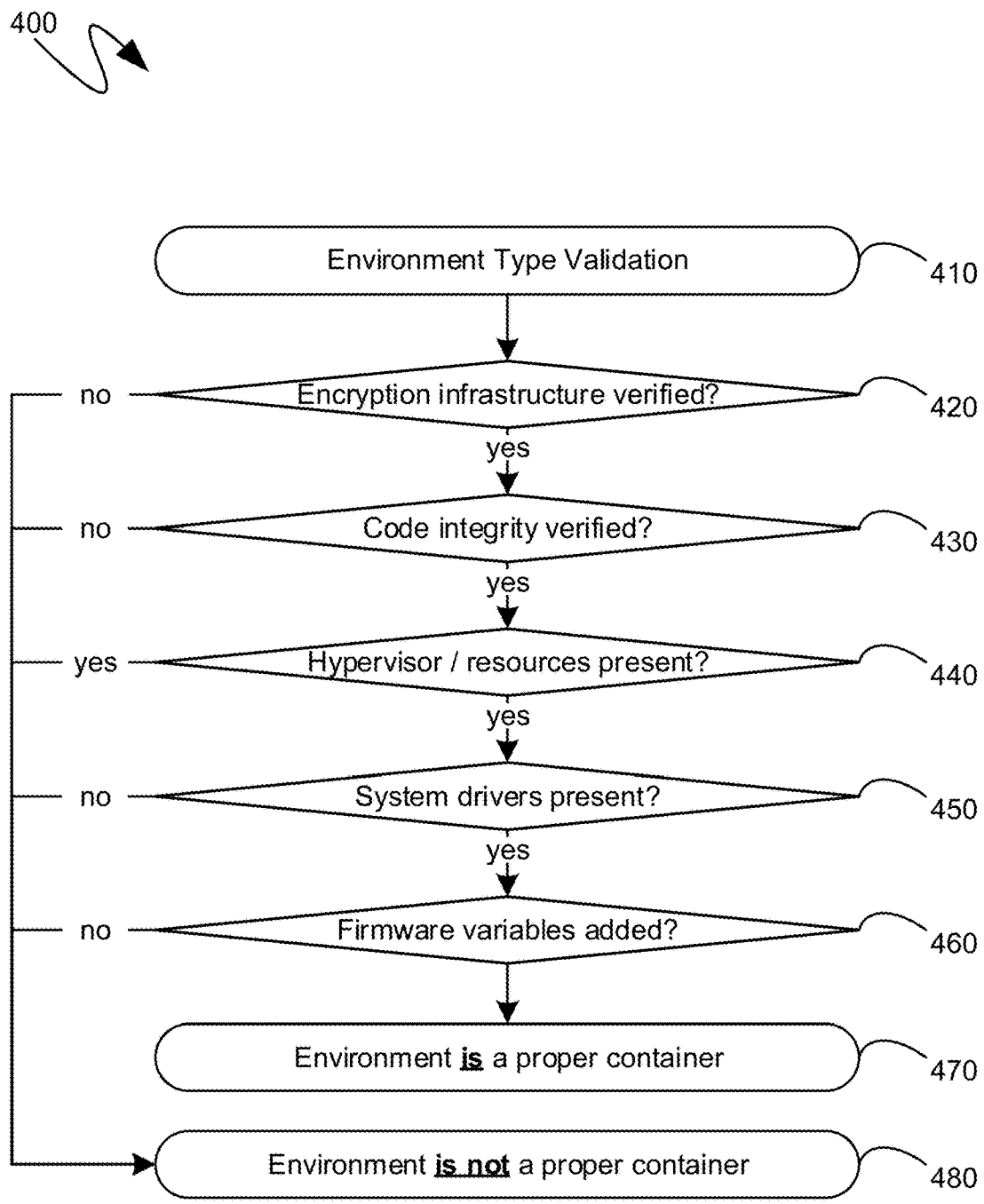
FIG. 4 is a flow diagram of an exemplary validation of a virtual environment type.

Turning to FIG. 4, the exemplary flow diagram 400 shown therein illustrates an exemplary series of steps that can be performed by an environment type validation, such as the exemplary environment type validation detailed above. According to one aspect, one or more of such steps can be performed as preliminary steps, with subsequent steps being performed to further validate conclusions reached by preliminary steps. Alternatively, or in addition, the conclusion 480 that the execution environment is not a proper container can be reached if any one or more of the steps make a particular determination, while the conclusion 470 that the execution environment is a proper container can be reached only if none of the steps determine to the contrary. Additionally, the order of the steps performed can vary, and the order illustrated in FIG. 4 is merely exemplary. Lastly, as indicated previously, the conclusions 470 and 480, being a Boolean value output by the environment type validation are but one aspect, and, in other aspects, the conclusions made can be an indication of a specific type of execution environment, such as selected from among a predefined range of possibilities, as well as the provision of information or other like metadata, including outputting information regarding the results of any one or more of the checks performed, such as those illustrated by steps 420-460.

The exemplary flow diagram 400 commences with step 410, when an environment type validation can be requested or initiated. In response an initial determination, such as, for example, a verification of the encryption infrastructure, can be performed at step 420. As indicated previously, such a verification of the encryption infrastructure can be a verification of a proper attestation of the booted operating system of the execution environment, or proper attestation of the booted operating system in combination with one or more executed application programs, or other like attestation. As also indicated previously, a verification of the encryption infrastructure, such as at step 420, can be a verification that certificates in a certificate store of the execution environment have an expected root of trust, or are otherwise properly signed. If the execution environment comprises a TPM, step 420 can also comprise a comparison of measurements from a host computing environment TPM, such as can have been obtained during attestation of the host computing environment, and measurements from the execution environment within which the instructions corresponding to step 420 are being executed, such as the container environment being validated. If, at step 420, the encryption infrastructure, such as in the manner detailed above, is not verified, the conclusion 480 can be reached that the execution environment is not a proper container. Alternatively, if, at step 420, the encryption infrastructure is verified, processing can proceed to perform one or more other checks, such as those of steps 430 through 460.

Although illustrated in the exemplary flow diagram 400 as a subsequent step 430, according to one aspect, step 430 can be performed initially, instead of step 420. As detailed above, at step 430, code integrity mechanisms can be verified. For example, a code integrity policy file can be verified, such as by confirming that the hash of the code integrity policy file matches a hash of a known good code integrity policy file. As another example, the known good code integrity policy file, and its corresponding hash, can be stored in a security catalog, or other like data structure that can, itself, be protected. As such, another aspect of step 430 can be the verification that such a security catalog has been signed by an organization's trust certificate, or other can otherwise be verified. If, at step 430, the code integrity mechanisms, such as in the manner detailed above, are not verified, the conclusion 480 can be reached that the execution environment is not a proper container. Alternatively, if, at step 430, the code integrity mechanisms are verified, processing can proceed to perform one or more other checks, such as those of steps 440 through 460.

As indicated previously, steps 440 through 460 can be alternative, or secondary verifications that can be performed to further validate the environment type. For example, at step 440, the presence or absence or availability or unavailability of specific resources, such as the presence of a hypervisor, can be checked. As detailed above, the presence of a hypervisor can be determined indirectly by determining that CPUs available within the execution environment expose functionality provided by a hypervisor, which can be determined through appropriate API calls. Other resources whose presence can be determined can include resource management stacks, which can be turned off in a container, and, consequently, the detection of resource management stacks being turned off can be an indicator that the execution environment is a proper container. Conversely, the detection of a hypervisor, or the detection of resource management stacks being turned on, can result in the conclusion 480 that the environment is not a proper container.

As another example, at step 450, a check can be made as to whether specific system drivers are present within the execution environment. If the relevant system drivers are not present within the execution environment, or if they are configured in a manner that differs from a predetermined correct configuration, the conclusion 480 can be reached that the environment is not a proper container. As yet another example, at step 460, a check can be made of the firmware, as accessible from the execution environment. For example, specific firmware variables can be required to be added to the environment, such as by a container manager, or the host computing environment. The absence of such firmware variables can result in the conclusion 480 that the environment is not a proper container.

Upon completion of the various checks, if the conclusion 480 that the environment is not a proper container was not otherwise reached, a contrary conclusion 470 that the environment is a proper container can be reached and communicated to processes invoking the environment type validation.

Figure 5:
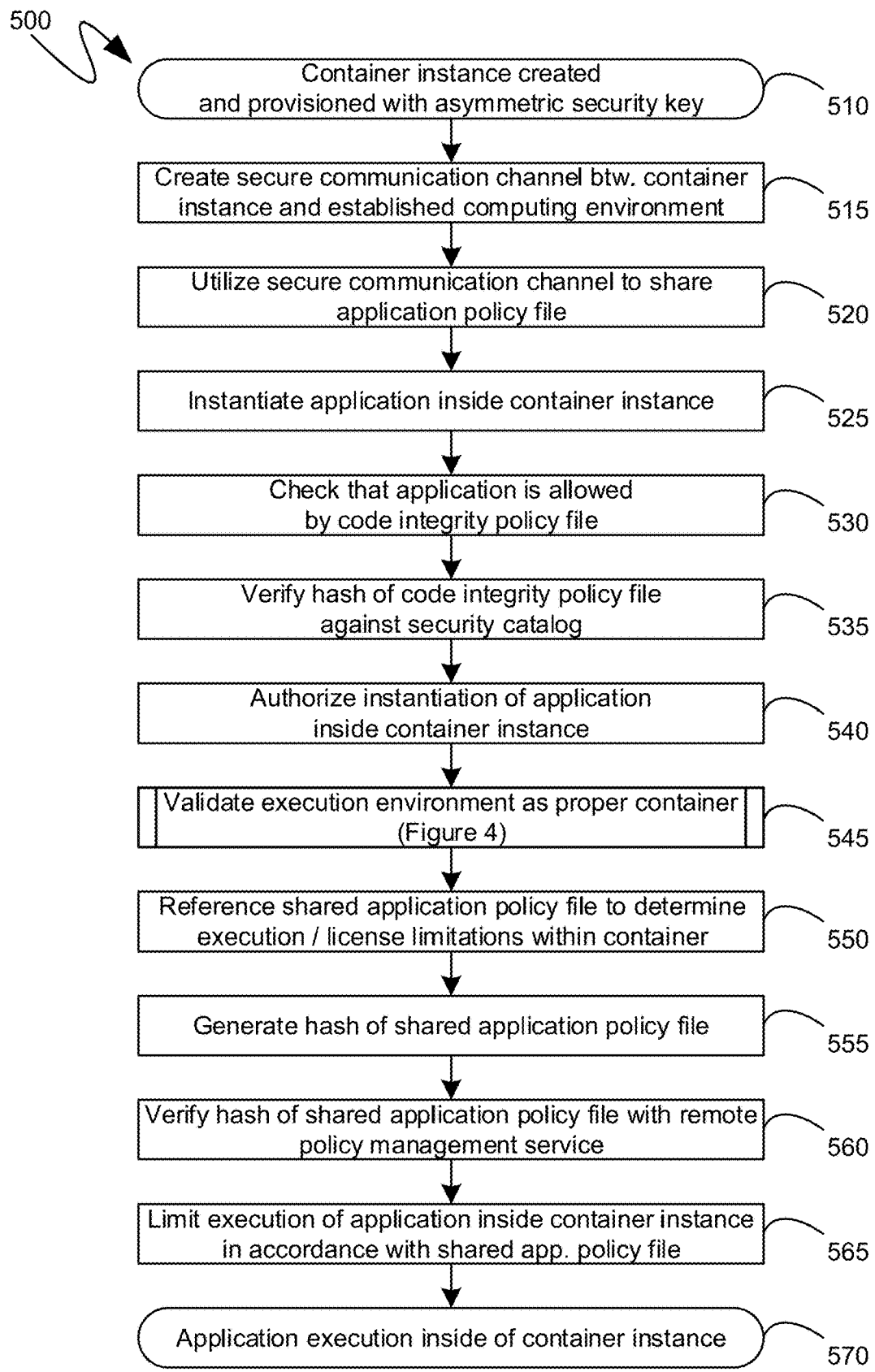
FIG. 5 is a flow diagram of an exemplary policy enforcement utilizing virtual environment type validation.

As indicated previously, such an environment type validation can be part of a larger validation mechanism to provide for the sharing of a license between a host execution environment and a container execution environment. Turning to FIG. 5, the exemplary flow diagram 500 shown therein illustrates an exemplary series of steps that can be performed to facilitate such sharing and allow an application program to execute within the container instance. Initially, at step 510, a container instance can be created, such as by a container manager, and can be provisioned with one or more cryptographic data, such as asymmetric security keys, which can then be utilized, such as at step 515, to establish a secure communicational channel between the container instance and an established computing environment that can act as a host computing environment, and which can have triggered the creation of the container instance at step 510. At step 520 the secure communication channel established at step 515 can be utilized to share an application policy file from the host computing environment to the container instance. As indicated previously, according to one aspect, the establishment of a secure communication channel 515 can be contingent upon the validation of the execution environment as a proper container, such as in the manner illustrated in FIG. 4, the performance of which is summarily shown in the exemplary flow diagram 500 of FIG. 5 as step 545.

At step 525 the relevant application program can attempt to be instantiated inside the container instance created at step 510. As part of such an instantiation, processing can proceed to step 530, where the code integrity policy file can be checked to confirm that the application is allowed to execute. As indicated previously, code integrity protections can be enforced by policy files that can be either in the form of a whitelist, a blacklist, or combinations thereof. At step 535, the code integrity policy can be verified, such as by hashing the code integrity policy and verifying the hash against a security catalog that can comprise hashes of known good code integrity policies. The verification, at step 535, can further entail the verification of the security catalog itself, such as by verifying that it was properly signed. At step 540, the code integrity can authorize the instantiation of the application program inside the container instance.

As part of the referencing of the application policy, shared at step 520, the execution environment can be validated as a proper container, such as in the manner detailed above with reference to FIG. 4. Within the exemplary flow diagram 500 shown in FIG. 5, such a validation is shown as occurring at step 545, though, as indicated previously, it can occur at other points within the exemplary flow diagram 500 and can be provided as input to multiple steps of the exemplary flow diagram 500. One such step can be the referencing of the shared application policy at step 550. As indicated previously, if, at step 545, the execution environment is validated as a proper container, the shared application policy can be referenced, at step 550, to determine whether the license, or other policy implications, allow for the execution of the application program within a virtual computing environment created by a properly validated container. The referencing, at step 550, can determine that, to facilitate the execution of application programs within containers, the relevant policy file can deactivate certain checks, such as limitations based on user identification, machine identification and other like checks that can be not performed due to the validation of the execution environment is a proper container. Subsequently, at step 555, a hash of the application policy can be generated and, at step 560, can be verified by comparing the hash to known good policy hashes, such as by reference to a remote policy management service. As indicated previously, the policy management service can execute within the container instance, can execute on a same computing device as the container instance, but externally to the container instance, or can execute on one or more remote computing devices. If, at step 560, the shared application policy is verified, then processing can proceed to step 565 and the application can be appropriately notified, such as by being instructed to execute with appropriate limitations based on conditionals in the shared application policy, as informed by the validation of step 545. More specifically, while some checks may be deactivated due to the validation of the execution environment as a proper container, such as at step 545, other checks, such as time-based checks, for example, can still be part of the application policy and if the application is attempting to execute after a license has expired, for example, then execution of the application inside of the container instance can still be limited at step 565. In other instances, step 565 may not limit the execution of the application and can, instead, allow the application to execute within the container instance and provide full functionality. With the appropriate feedback from the policy management, the execution of the application inside of the container instance can then proceed at step 570.

Figure 6:
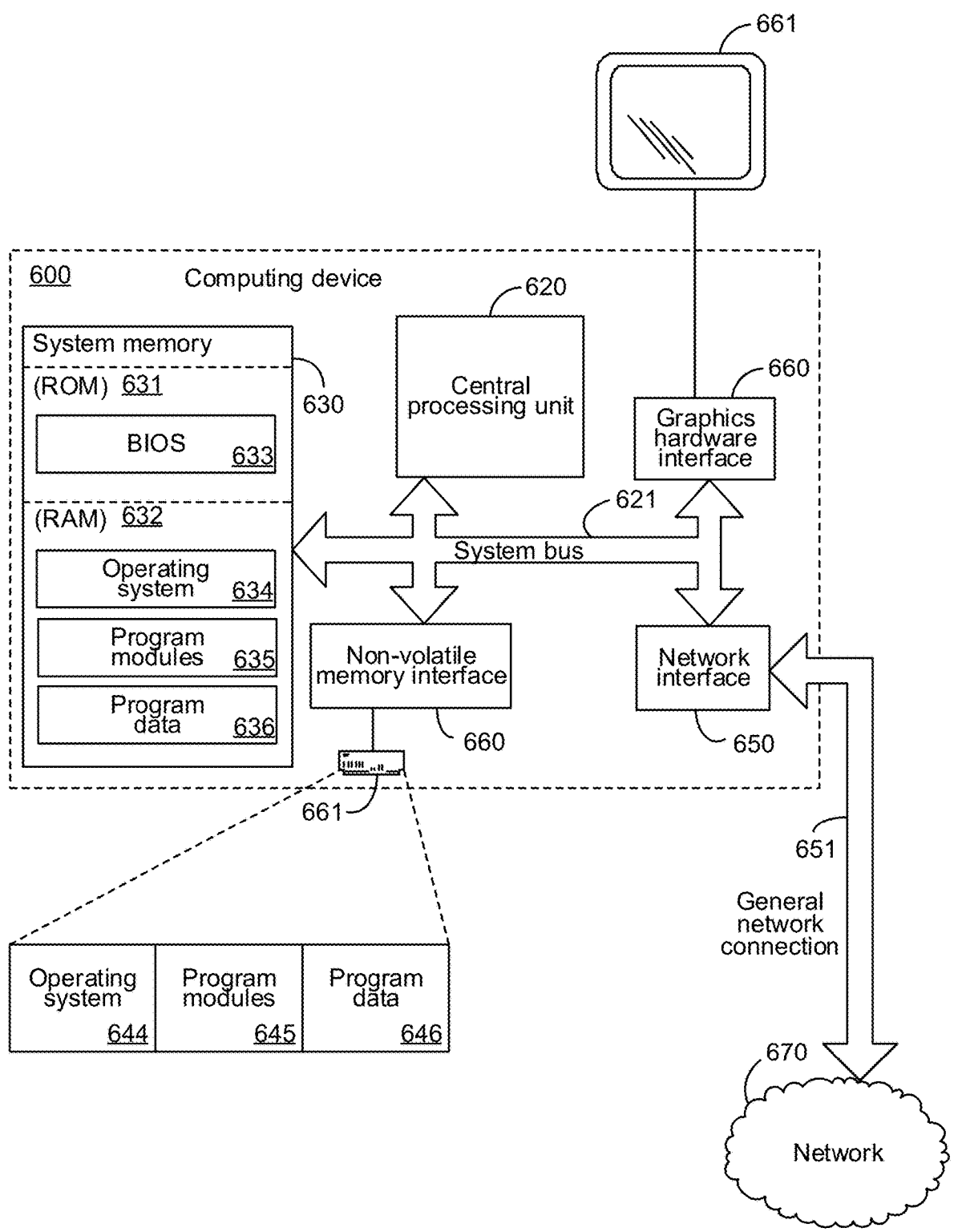
FIG. 6 is a block diagram of an exemplary computing device.

Turning to FIG. 6, an exemplary computing device 600 is illustrated which can perform some or all of the mechanisms and actions described above. The exemplary computing device 600 can include, but is not limited to, one or more central processing units (CPUs) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, including, but not limited to, a graphics hardware interface 660 and a display device 661, which can include display devices capable of receiving touch-based user input, such as a touch-sensitive, or multi-touch capable, display device. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 600. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer content between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, other program modules 635, and program data 636.

The computing device 600 may also include other removable/non-removable, volatile/nonvolatile computer storage media. By way of example only, FIG. 6 illustrates a hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 641 is typically connected to the system bus 621 through a non-volatile memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 may operate in a networked environment using logical connections to one or more remote computers. The computing device 600 is illustrated as being connected to the general network connection 651 (to the network 670) through a network interface or adapter 650, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

Although described as a single physical device, the exemplary computing device 600 can be a virtual computing device, in which case the functionality of the above-described physical components, such as the CPU 620, the system memory 630, the network interface 640, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 600 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a method of enforcing policy limitations on an execution of an application program within a first computing environment, the method comprising: obtaining application policy data, corresponding to the application program, from a second computing environment differing from the first computing environment, the application policy data specifying a first precondition that is to be bypassed when the first computing environment is a container virtual computing environment; performing environment type validation comprising at least one of: checking an encryption infrastructure of the first computing environment; checking a code integrity infrastructure of the first computing environment; or checking for hypervisor functionality within the first computing environment; and limiting the execution of the application program based on the first precondition when the performed environment type validation determines that the first computing environment is not a container virtual computing environment.

A second example is the method of the first example, wherein the checking the encryption infrastructure comprises verifying a proper attestation of an operating system of the first computing environment.

A third example is the method of the second example, wherein the checking the encryption infrastructure comprises verifying a proper attestation of a combination of the operating system of the first computing environment and the application program.

A fourth example is the method of the second example, wherein the verifying the proper attestation of the operating system of the first computing environment comprises communicating with a remote attestation service that is external to the first computing environment.

A fifth example is the method of the second example, wherein the verifying the proper attestation of the operating system of the first computing environment comprises comparing attestation measurements from a first Trusted Platform Module (TPM) in the first computing environment to attestation measurements from a second TPM in the second computing environment.

A sixth example is the method of the first example, wherein the checking the encryption infrastructure comprises verifying that a certificate in a first certificate store of the first computing environment is signed by a pre-determined root of trust.

A seventh example is the method of the first example, wherein the checking the code integrity infrastructure comprises verifying a hash of an active code integrity policy file against a security catalog comprising hashes of known good code integrity policy files An eighth example is the method of the seventh example, wherein the checking the code integrity infrastructure comprises verifying that the security catalog is signed by one of a predetermined trusted organization's certificate.

A ninth example is the method of the first example, wherein the checking for the hypervisor functionality comprises checking whether processor functionality commensurate with a hypervisor is exposed by a central processing unit of the first computing environment.

A tenth example is the method of the first example, wherein the performing the environment type validation comprises checking whether a predetermined system driver component is present within the first computing environment.

An eleventh example is the method of the first example, wherein the performing the environment type validation comprises checking whether a resource management stack is deactivated within the first computing environment.

A twelfth example is the method of the first example, wherein the performing the environment type validation comprises checking whether a predetermined firmware variable is set to a predetermined value within a firmware of the first computing environment.

A thirteenth example is the method of the first example, wherein the first precondition limits execution of the application program to a specific computing device hardware machine identifier.

A fourteenth example is the method of the first example, wherein the first precondition limits execution of the application program to a specific user identifier.

A fifteenth example is the method of the first example, further comprising verifying the obtained application policy data by reference to a policy management service external to the first computing environment.

A sixteenth example is a computing device comprising: one or more processing units; and one or more computer-readable storage media comprising computer-executable instructions, which, when executed by at least some of the processing units, cause the computing device to: obtain application policy data, corresponding to the application program, from a second computing environment differing from the first computing environment, the application policy data specifying a first precondition that is to be bypassed when the first computing environment is a container virtual computing environment; perform environment type validation comprising at least one of: checking an encryption infrastructure of the first computing environment; checking a code integrity infrastructure of the first computing environment; or checking for hypervisor functionality within the first computing environment; and limit the execution of the application program based on the first precondition when the performed environment type validation determines that the first computing environment is not a container virtual computing environment.

A seventeenth example is the computing device of the sixteenth example, wherein both the first computing environment and the second computing environment are hosted by the computing device.

An eighteenth example is the computing device of the sixteenth example, wherein the first computing environment is are hosted by the computing device and the second computing environment is hosted by a second computing device, differing from the first computing device, the second computing device being communicationally coupled to the computing device.

A nineteenth example is one or more computer-readable storage media comprising computer-executable instructions, which, when executed within a first computing environment, perform steps comprising: receiving a request to validate a type of the first computing environment; performing at least one of: checking an encryption infrastructure of the first computing environment; checking a code integrity infrastructure of the first computing environment; or checking for hypervisor functionality within the first computing environment; and generating an environment type validation Boolean output value indicative of the first computing environment not being a container virtual computing environment if at least one of the checking of the encryption infrastructure or the checking of the code integrity infrastructure failed, or if the checking for the hypervisor functionality confirmed hypervisor functionality within the first computing environment.

A twentieth example is the one or more computer-readable storage media of the nineteenth example, wherein the computer-executable instructions, when executed, perform further steps comprising performing at least one of: checking whether a predetermined system driver component is present within the first computing environment; checking whether a resource management stack is deactivated within the first computing environment; or checking whether a predetermined firmware variable is set to a predetermined value within a firmware of the first computing environment.

As can be seen from the above descriptions, mechanisms for securely validating a virtual environment type and utilizing such secure validation to provide tamper-resistant policy enforcement have been presented. In view of the many possible variations of the subject matter described herein, we claim as our invention all such embodiments as may come within the scope of the following claims and equivalents thereto.

We claim:

1. A method of enforcing policy limitations on an execution of an application program within a first computing environment, the method comprising:
obtaining application policy data, corresponding to the application program, from a second computing environment differing from the first computing environment, the application policy data specifying a first precondition that is to be bypassed when the first computing environment is a container virtual computing environment;
performing environment type validation comprising at least one of:
checking an encryption infrastructure of the first computing environment;
checking a code integrity infrastructure of the first computing environment; or
checking for hypervisor functionality within the first computing environment; and
limiting the execution of the application program based on the first precondition when the performed environment type validation determines that the first computing environment is not a container virtual computing environment.

2. The method of claim 1, wherein the checking the encryption infrastructure comprises verifying a proper attestation of an operating system of the first computing environment.

3. The method of claim 2, wherein the checking the encryption infrastructure comprises verifying a proper attestation of a combination of the operating system of the first computing environment and the application program.

4. The method of claim 2, wherein the verifying the proper attestation of the operating system of the first computing environment comprises communicating with a remote attestation service that is external to the first computing environment.

5. The method of claim 2, wherein the verifying the proper attestation of the operating system of the first computing environment comprises comparing attestation measurements from a first Trusted Platform Module (TPM) in the first computing environment to attestation measurements from a second TPM in the second computing environment.

6. The method of claim 1, wherein the checking the encryption infrastructure comprises verifying that a certificate in a first certificate store of the first computing environment is signed by a pre-determined root of trust.

7. The method of claim 1, wherein the checking the code integrity infrastructure comprises verifying a hash of an active code integrity policy file against a security catalog comprising hashes of known good code integrity policy files.

8. The method of claim 7, wherein the checking the code integrity infrastructure comprises verifying that the security catalog is signed by one of a predetermined trusted organization's certificate.

9. The method of claim 1, wherein the checking for the hypervisor functionality comprises checking whether processor functionality commensurate with a hypervisor is exposed by a central processing unit of the first computing environment.

10. The method of claim 1, wherein the performing the environment type validation comprises checking whether a predetermined system driver component is present within the first computing environment.

11. The method of claim 1, wherein the performing the environment type validation comprises checking whether a resource management stack is deactivated within the first computing environment.

12. The method of claim 1, wherein the performing the environment type validation comprises checking whether a predetermined firmware variable is set to a predetermined value within a firmware of the first computing environment.

13. The method of claim 1, wherein the first precondition limits execution of the application program to a specific computing device hardware machine identifier.

14. The method of claim 1, wherein the first precondition limits execution of the application program to a specific user identifier.

15. The method of claim 1, further comprising verifying the obtained application policy data by reference to a policy management service external to the first computing environment.

16. A computing device comprising:
one or more processing units; and
one or more non-transitory computer-readable storage media comprising computer-executable instructions, which, when executed by at least some of the processing units, cause the computing device to:
obtain application policy data, corresponding to the application program, from a second computing environment differing from the first computing environment, the application policy data specifying a first precondition that is to be bypassed when the first computing environment is a container virtual computing environment;
perform environment type validation comprising at least one of:
checking an encryption infrastructure of the first computing environment;
checking a code integrity infrastructure of the first computing environment; or
checking for hypervisor functionality within the first computing environment; and
limit the execution of the application program based on the first precondition when the performed environment type validation determines that the first computing environment is not a container virtual computing environment.

17. The computing device of claim 16, wherein both the first computing environment and the second computing environment are hosted by the computing device.

18. The computing device of claim 16, wherein the first computing environment is are hosted by the computing device and the second computing environment is hosted by a second computing device, differing from the first computing device, the second computing device being communicationally coupled to the computing device.

19. One or more non-transitory computer-readable storage media comprising computer-executable instructions, which, when executed within a first computing environment, perform steps comprising:
receiving a request to validate a type of the first computing environment;
performing at least one of:
checking an encryption infrastructure of the first computing environment;
checking a code integrity infrastructure of the first computing environment; or
checking for hypervisor functionality within the first computing environment; and
generating an environment type validation Boolean output value indicative of the first computing environment not being a container virtual computing environment if at least one of the checking of the encryption infrastructure or the checking of the code integrity infrastructure failed, or if the checking for the hypervisor functionality confirmed hypervisor functionality within the first computing environment.

20. The one or more non-transitory computer-readable storage media of claim 19, wherein the computer-executable instructions, when executed, perform further steps comprising performing at least one of:
checking whether a predetermined system driver component is present within the first computing environment;
checking whether a resource management stack is deactivated within the first computing environment; or
checking whether a predetermined firmware variable is set to a predetermined value within a firmware of the first computing environment.

* * * * *